Jan. 26, 1943.   H. W. SAWYER   2,309,543
DEVICE FOR RELEASING GAS FROM MOLDED DOUGH
Filed Jan. 14, 1942   3 Sheets-Sheet 2
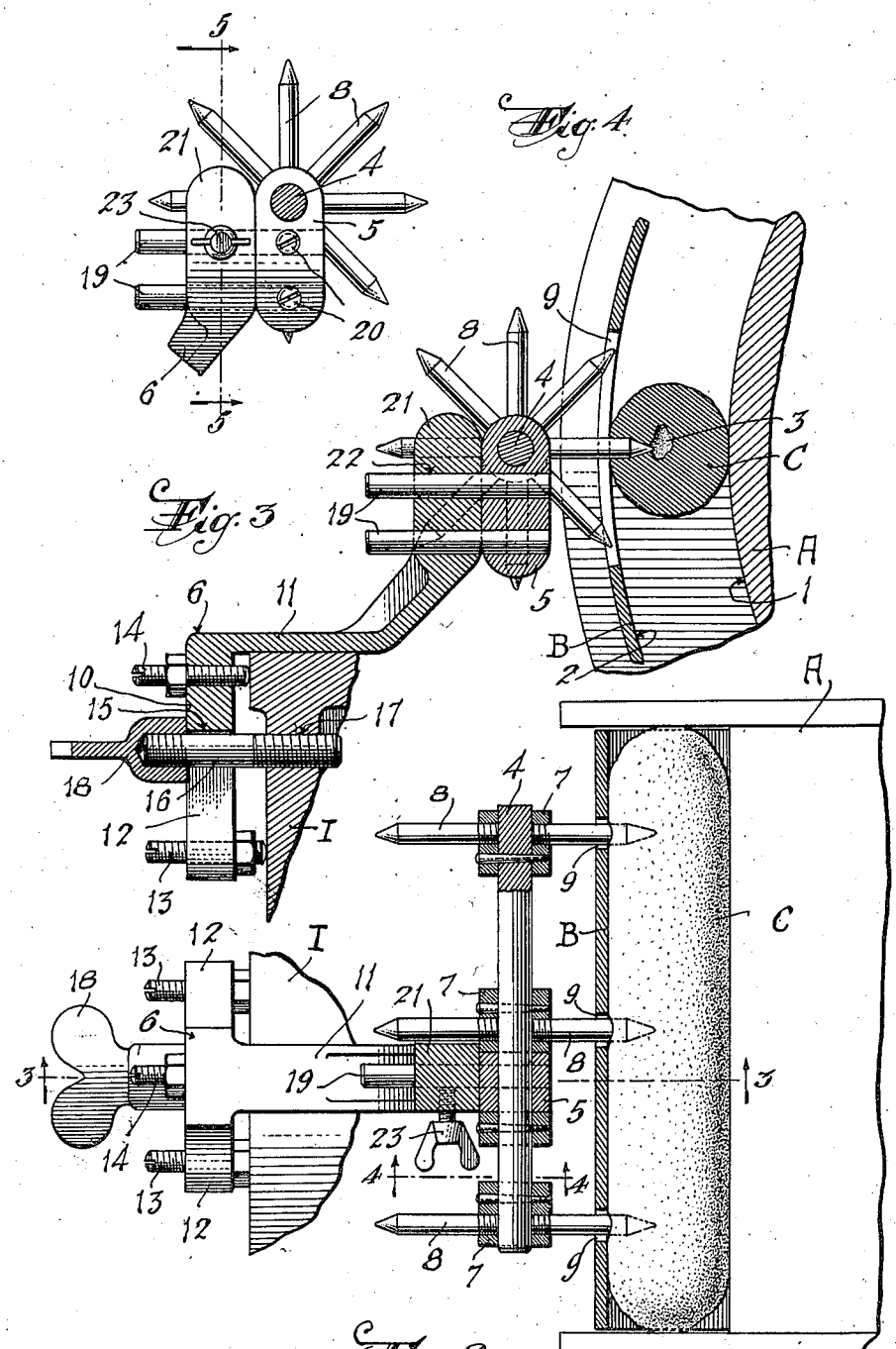

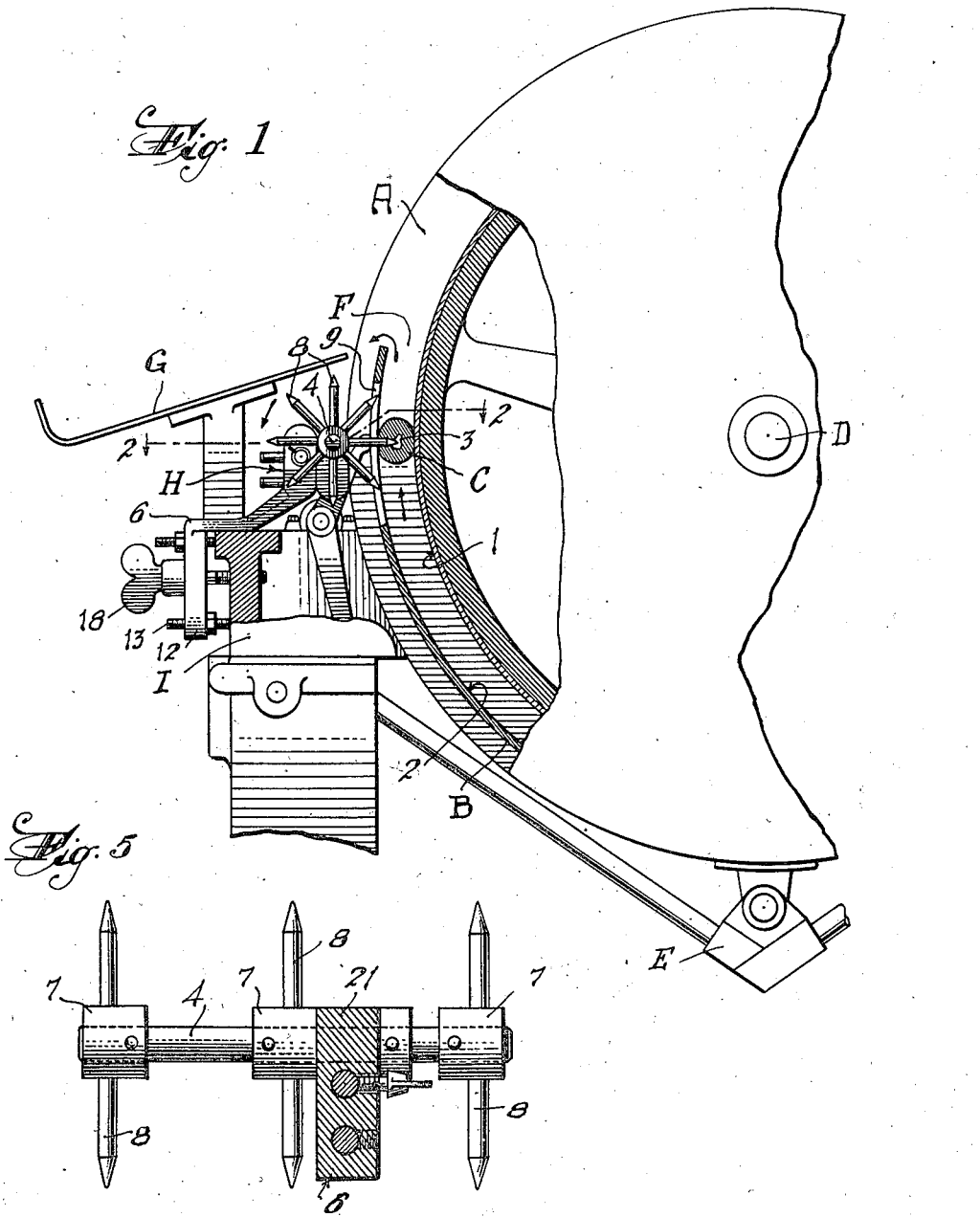

Jan. 26, 1943. H. W. SAWYER 2,309,543
DEVICE FOR RELEASING GAS FROM MOLDED DOUGH
Filed Jan. 14, 1942 3 Sheets-Sheet 3
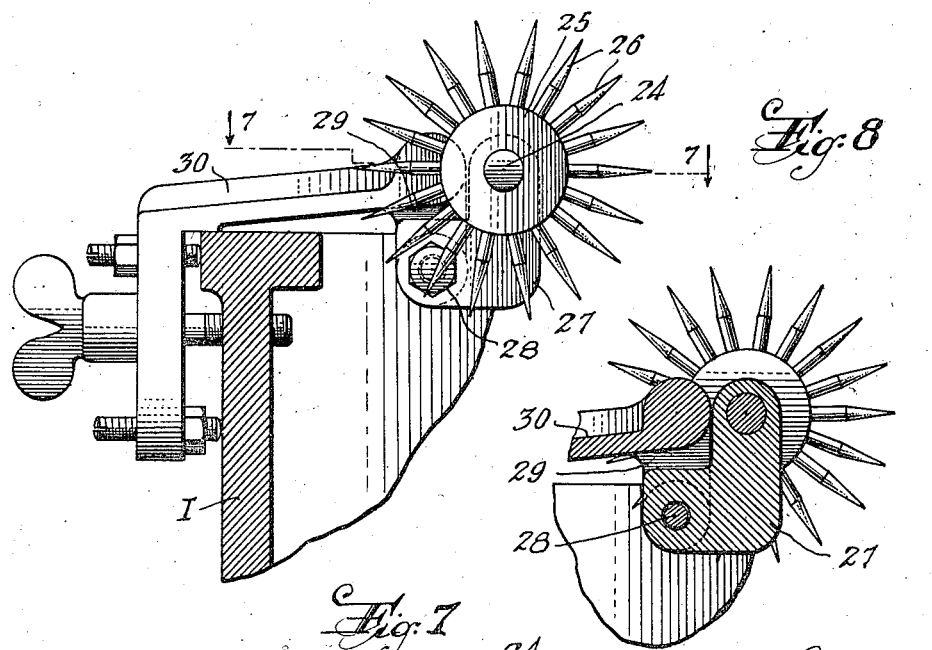
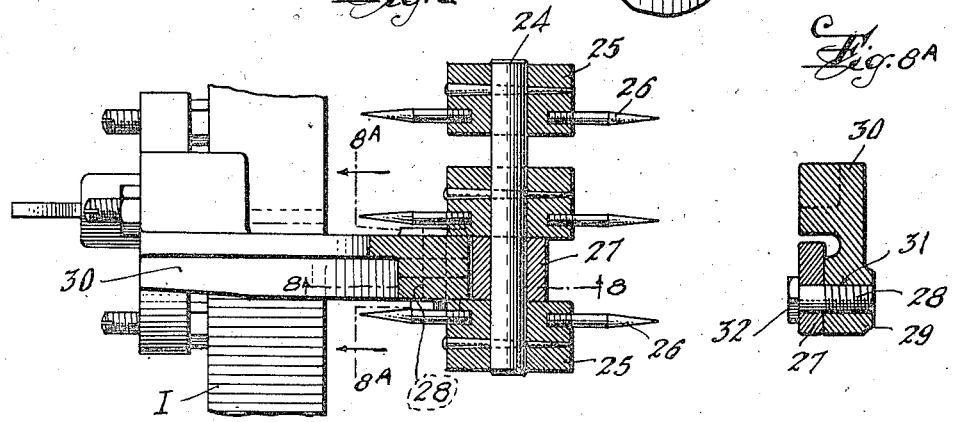

Patented Jan. 26, 1943

2,309,543

UNITED STATES PATENT OFFICE 2,309,543

DEVICE FOR RELEASING GAS FROM MOLDED DOUGH

Hilon W. Sawyer, Nutley, N. J., assignor to Thomson Machine Company, Belleville, N. J., a corporation of New Jersey Application January 14, 1942, Serial No. 426,662

3 Claims. (Cl. 107—9)

This invention relates to an attachment for dough molding machines of the type used for shaping and kneading dough into cylindrical form preparatory to baking.

In machines of this character, a lump of dough is formed into a sheet and thereafter spirally rolled into a cylindrical loaf which is kneaded and stretched between the complemental molding surfaces of two relatively movable spaced molding members, for example between the peripheral surface of a rotating drum and the surface of an arcuate compression plate that partially surrounds the drum in spaced relation to said peripheral surface. During the kneading and stretching operation gas pockets incident to the presence of yeast in the dough, are formed in the loaf, and while these gas pockets are necessary for lightness and porosity of the loaf when it is baked, it is desirable that the pockets be limited in size to prevent excessive expansion of the loaf and to avoid large holes in the baked loaf.

Therefore, one object of my invention is to provide in a dough molding machine novel and improved means for releasing some of the gas that is entrapped in pockets in the loaf, especially at the center thereof, immediately upon completion of the kneading and stretching operation, whereby excessive expansion of the loaf shall be prevented, the desired volume of the loaf shall be ensured, and objectionably large voids in the loaf shall be obviated.

Another object is to provide a novel and improved device to be attached to a dough molding machine adjacent the point of discharge of the loaf from the molding and kneading members to penetrate the load for releasing entrapped gas, whereby the loaf shall be moved into contact with said device as the loaf is rolled between said members and said device shall produce a plurality of gas-releasing perforations in the loaf in one continuous operation.

Further objects are to provide such a device that shall have a plurality of radially disposed loaf-penetrating needles and shall be revoluble about an axis parallel to the axis of rolling of the loaf between the molding members of the molding machine; and to construct and mount the device so that it shall be rotated by contact with said loaf as the latter is rolled so that a plurality of said needles shall penetrate the loaf at spaced points in its circumference.

To accommodate loaves of different diameter in molding machines of this character, one of the molding members is adjustable toward and from the other member. Therefore, other objects are to provide a loaf penetrating element of the general character described and novel and improved means including a bracket for mounting it on a dough molding machine, whereby the bracket can be easily, quickly and accurately mounted and adjusted on the machine and the loaf-penetrating element can be adjusted on the bracket, to accommodate spacing of the molding members different distances apart and to vary the distance of projection of said loaf penetrating element into the space between the molding members; and to obtain other advantages and results as will be brought out by the following description and the accompanying drawings in which—

Figure 1 is a side elevational view of a dough molding machine including a loaf penetrating device embodying my invention, portions of the machine being broken away and shown in vertical section.

Figure 2 is a enlarged top plan view of the machine and loaf penetrating device with portions broken away and shown in section on the line 2—2 of Figure 1.

Figure 3 is a vertical sectional view on the line 3—3 of Figure 2.

Figure 4 is a vertical sectional view on the line 4—4 of Figure 2.

Figure 5 is a vertical sectional view on the line 5—5 of Figure 4.

Figure 6 is a side elevational view of a modified form of the loaf penetrating device.

Figure 7 is a horizontal sectional view on the line 7—7 of Figure 6.

Figure 8 is a vertical sectional view on the line 8—8 of Figure 7, and

Figure 8A is a vertical sectional view on the line 8A—8A of Figure 7.

For the purpose of illustrating the principles of the invention I have shown it in connection with a known type of loaf molder, for example, as shown in Patent No. 701,646 dated June 2, 1902, which includes two relatively movable spaced molding members A and B that have complemental molding surfaces 1 and 2 respectively to roll a cylindrical loaf of dough C between them and discharge the loaf. More particularly the member A comprises a drum revoluble on a shaft D journaled in a frame I and the member B comprises an arcuate compression plate which surrounds a part of the periphery of the drum in spaced relation thereto. The drum is driven in any suitable manner and the compression plate is adjustable toward and from the drum by suitable means E to vary the pressure exerted on the loaf of dough which is discharged from the compression plate at F and automatically deposited by action of gravity either upon a tray G, or a panning conveyor which sometimes is used.

During the kneading and rolling of the loaf C between the molding members, the loaf is stretched and gradually reduced in diameter, and due to this stretching and the presence of yeast in the dough, gas pockets 3 are formed in the loaf, and my invention includes a device for penetrating or forming perforations in the loaf to limit the size of said gas pockets to prevent excessive expansion of the loaf and thereby to avoid large holes in the baked loaf.

A loaf penetrating device generally designated H is mounted on the frame I of the machine adjacent the point of discharge of the loaf C from between the molding members, so as to penetrate or form perforations in the loaf immediately upon completion of the kneading and stretching operation.

Referring particularly to Figures 1 to 5, inclusive, the loaf penetrating device comprises a loaf penetrating element which is shown as including a shaft 4 journaled in a bearing member 5 that is in turn mounted on a bracket 6. This bracket is secured on the frame I with the shaft 4 approximately parallel to the axis of rolling of the loaf C between the molding members, and the shaft 4 has a plurality of hubs 7 keyed thereon and each having a plurality of radial needles 8 which are adapted successively to extend through slots 9 in the compression plate B into the space between the molding members A and B.

As shown in Figure 2, the various hubs and the corresponding needles are spaced longitudinally of the loaf C and successively project into the space between the molding members as the hubs are rotated so that the needles successively will contact with and penetrate or form perforations in the loaf as the latter is rolled past the loaf penetrating device between the molding members. As shown, the loaf penetrating element, including the hubs and the needles will be rotated by contact with the loaf.

Preferably the needles project into the space between the molding members a distance less than the diameter of the loaf so that the needles will penetrate the loaf to about the longitudinal center thereof and enter certain of the gas pockets so as to release the gas entrapped in said pockets through the perforations formed by the needles.

The bracket 6 is adjustably mounted on the frame, particularly to accommodate location of the compression plate different distances from the periphery of the drum, and as shown, the bracket is movable in directions perpendicular to the axes of the shaft 4 and the loaf so as to adjust the loaf penetrating element toward and from the molding members. Any suitable means may be utilized for the adjustable mounting but preferably the bracket is formed with an angular base one arm 11 of which is adapted to underlie the top of the frame I while the other arm 10 is adapted to lie along the vertical end wall of the frame. The arm 10 also is preferably bifurcated to form outwardly diverging fingers 12 in each of which is arranged an adjustable set screw 13. Another adjustable set screw 14 is mounted in the arm 10 adjacent the meeting thereof with the arm 11. At the meeting point of the fingers 12, the arm 10 has an opening 15 to loosely receive a clamping screw 16, one end of which is screw threaded to fit a correspondingly threaded opening 17 in the vertical end wall of the frame I. The other end of the screw 16 has an operating head or nut 18 to abut the outer side of the arm 10. With this construction, the bracket is secured to the frame I with the arm 11 resting on the top of the frame and the set screws 13 and 14 bearing against the vertical end wall of the frame. The clamping screw 16 and nut 18 securely hold the bracket upon the frame against both vertical and horizontal movement. By adjusting the set screws 13 and 14, the location of the bracket on the frame may be varied to position the loaf penetrating element in proper operative relation to the compression plate B.

Also, in accordance with the invention the loaf penetrating element is adjustably mounted on the bracket 6. As shown, the bearing block has a pair of parallel rods 19 rigidly secured therein by set screws 20, and the arm 11 of the bracket has an upturned head 21 formed with parallel openings 22 to slidably receive the respective rods 19 whereby the bearing block can be mounted on the bracket for movement toward and from the supporting head 21. In this way the loaf penetrating element may be located different distances from the supporting head 21 of the bracket so as to cause the needles 8 to extend different distances into the space between the molding members A and B. For holding the bearing block in adjusted position a set screw 23 may be threaded in the head 21 of the bracket to clamp one of the rods 19 against movement in its opening 22.

A modification of the invention is shown in Figures 6 to 8A inclusive wherein the loaf penetrating element includes a shaft 24 having hubs 25 keyed thereon and each having radial loaf penetrating needles 26. The shaft 24 is journaled in one arm of an L-shaped bearing block 27, the other arm of which is pivotally mounted at 28 on a depending arm 29 of a bracket 30 that corresponds to the bracket 6. With this construction, the loaf penetrating element may be adjusted on the bracket by rotation of the bearing block 27 about the pivot 28. This pivot 28 is shown as comprising a cap screw threaded in an opening 31 of the arm 29 of the bracket, and the arm of the bearing block 27 may be clamped between the arm 29 and the head 32 of the screw 28 to hold the loaf penetrating element in adjusted position. The bracket 30 may be otherwise constructed and mounted on the frame I in the same manner and as described in connection with the bracket 6.

It will be observed that the number and size of the needles of the loaf penetrating elements may be varied as desired. Compare Figures 3 and 6, and it should also be understood that the number of hubs and sets of needles and the relative location of the hubs on the shafts 4 or 24 may be varied as desired.

In the forms of the invention shown in Figures 1 to 8 inclusive, a plurality of gas pockets will be successively opened by the successive penetration of the loaf by the various needles 8.

In all forms of the invention the gas will be released at the critical moment, that is, immediately after the completion of the kneading and stretching operation, and without separate handling or operation upon the loaf. Excessive gas is quickly released so as to prevent excessive expansion of the loaf but without affecting the volume of the loaf.

Many modifications and changes in the details of structure of the loaf penetrating devices may be made by those skilled in the art, and the devices may be utilized in conjunction with other types of dough molding machines, all without departing from the spirit or scope of the invention.

Having thus described my invention, what I claim is:

1. In a dough molding machine, two spaced relatively movable members having complemental molding surfaces for rolling a cylindrical loaf of dough between them and discharging the loaf, and a device rotatable about an axis parallel to the axis of rolling of the loaf and having radial needles to successively project into the space between said molding members as said device is rotated, said device being rotated by contact of said loaf with said needles as the loaf is rolled between said molding members to cause penetration of said loaf by said needles successively for release of gas entrapped in the loaf.

2. In a dough molding machine, a frame, two relatively movable spaced molding members on said frame having complemental molding surfaces to roll a cylindrical loaf of dough between them and discharge the loaf, one of said members being movable toward and from the other to accommodate loaves of different diameter, a device including a loaf-penetrating element comprising a shaft, a bearing block in which said shaft is journaled, a hub on said shaft having radial needles, a bracket, means mounting said bracket on said frame for movement toward and from the first-mentioned molding member, and means adjustably mounting said bearing block on said bracket for movement toward and from said first-mentioned molding member and with the axis of said shaft parallel to the axis of rolling of said loaf to cause said needles successively to project into said space between the molding members upon rotation of said hub, whereby said needles successively will penetrate said loaf as the latter is rolled between said molding members.

3. In a dough molding machine, a frame, two relatively movable spaced molding members on said frame having complemental molding surfaces to roll a cylindrical loaf of dough between them and discharge the loaf, one of said members being movable toward and from the other to accommodate loaves of different diameters and having an opening therethrough, a device rotatable about an axis parallel to the axis of rolling of said loaf and having radial needles to successively move into and out of the space between said members through said opening as said device is rotated, said needles being engaged by and penetrating said loaf as the latter is rolled between said molding members so that said device is rotated by the loaf to cause penetration of the latter successively by said needles for release of entrapped gas from the loaf, and means adjustably mounting said device on said frame to permit projection of said needles different distances into space between said molding members and to allow adjustment of said movable molding member and said device independently of each other to accommodate loaves of different diameters.

HILON W. SAWYER.